(12) United States Patent
Jiang et al.

(10) Patent No.: US 8,559,373 B2
(45) Date of Patent: Oct. 15, 2013

(54) SPACE DIVERSITY METHOD

(75) Inventors: Jing Jiang, Shenzhen (CN); Yunfeng Sun, Shenzhen (CN); Kaibo Tian, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 193 days.

(21) Appl. No.: 13/143,661

(22) PCT Filed: Jun. 30, 2009

(86) PCT No.: PCT/CN2009/072544
§ 371 (c)(1),
(2), (4) Date: Jul. 7, 2011

(87) PCT Pub. No.: WO2010/078744
PCT Pub. Date: Jul. 15, 2010

(65) Prior Publication Data
US 2011/0268038 A1    Nov. 3, 2011

(30) Foreign Application Priority Data
Jan. 7, 2009  (CN) .......................... 2009 1 0076109

(51) Int. Cl.
*H04W 4/00* (2009.01)
(52) U.S. Cl.
USPC ........................................................ 370/328
(58) Field of Classification Search
None
See application file for complete search history.

(56) References Cited

U.S. PATENT DOCUMENTS

| 2005/0141414 A1* | 6/2005 | Cheun et al. | 370/210 |
| 2008/0311873 A1* | 12/2008 | Kim et al. | 455/272 |
| 2010/0322349 A1* | 12/2010 | Lee et al. | 375/299 |

FOREIGN PATENT DOCUMENTS

CN    101296012 A    10/2008

OTHER PUBLICATIONS

International Search Report for PCT/CN2009/072544 with English Translation, Completed by the Chinese Patent and Trademark Office on Sep. 4, 2009, All together 6 Pages.
Lee et al. "Transmit Antenna Diversity Schemes", IEEE C802.16m-08/484, May 5, 2008, 7 Pages.
3 GPP TSG-RAN WG1 # 49, "CDD Precoding for 4Tx Antennas", May 7-11, 2007, 11 Pages.

* cited by examiner

*Primary Examiner* — John Blanton
(74) *Attorney, Agent, or Firm* — Brooks Kushman P.C.

(57) ABSTRACT

A space diversity method is disclosed having the steps of: setting space-frequency block coder (SFBC) based on Alamouti coder as the minimum unit of space-time coder; orthogonally processing the SFBC to acquire the transmission signals of part of antenna ports in eight antenna ports, and cyclically delaying the acquired transmission signals of antenna ports to obtain the transmission signals of the rest antenna ports; transmitting the acquired transmission signal in the corresponding time and sub-carrier by each antenna port. A space diversity device is also provided which has an orthogonal processing module, a signal cyclic delay module and a transmitting module. With the method and device, the eight-antenna data transmission in the long time evolution (LTE) advanced system is achieved, and better diversity gain is acquired without adding extra pilot overhead.

13 Claims, 1 Drawing Sheet

SPACE DIVERSITY METHOD

CROSS-REFERENCE TO RELATED APPLICATION

This application is the U.S. national phase of PCT Appln. No. PCT/CN2009/072544 filed Jun. 30, 2009 which claims priority to Chinese application CN 200910076109.2 filed Jan. 7, 2009, the disclosures of which are incorporated in their entirety by reference herein.

TECHNICAL FIELD

The present invention relates to the diversity technology in the long term evolution (LTE) Advanced system, and more especially, to a space diversity method and device based on cyclic delay in the LTE Advanced system.

BACKGROUND OF THE RELATED ART

In the long term evolution (LTE) system, diversity methods for the cases that there are two transmission antennae and that there are four antennae are defined in the downlink, wherein, the diversity method for the case that there are two transmission antennae is space-frequency block coder (SFBC), whose coder matrix is shown in equation (1):

$$\begin{array}{c} \text{Antenna1} \quad \text{Antenna 2} \end{array} \qquad (1)$$
$$\begin{array}{c} \text{Frequency} \\ 1 \\ \text{Frequency} \\ 2 \end{array} \begin{bmatrix} S_1 & -S_2^* \\ S_2 & S_1^* \end{bmatrix}$$

In equation (1), each column indicates one transmission antenna and each row indicates one transmission frequency; $S_1$ indicates the symbol sent in the first time, $S_2$ is the symbol sent in the second time, $S_1^*$ and $S_2^*$ indicate the conjugates of $S_1$ and $S_2$ respectively.

The diversity method for the case that there are four transmission antennae is space-frequency block coder (SFBC)+ frequency switch transmit diversity (FSTD), whose coder matrix is shown in equation (2):

$$\begin{array}{c} \text{Antenna 1} \quad \text{Antenna 2} \quad \text{Antenna 3} \quad \text{Antenna 4} \end{array} \qquad (2)$$
$$\begin{array}{c} \text{Frequency}_1 \\ \text{Frequency}_2 \\ \text{Frequency}_3 \\ \text{Frequency}_4 \end{array} \begin{bmatrix} S_1 & 0 & -S_2^* & 0 \\ S_2 & 0 & S_1^* & 0 \\ 0 & S_3 & 0 & -S_4^* \\ 0 & S_4 & 0 & S_3^* \end{bmatrix}$$

In equation (2), each column indicates one transmission antenna and each row indicates one transmission frequency; $S_1$, $S_2$, $S_3$ and $S_4$ indicate the symbols sent at the first, second, third and fourth time points respectively, $S_1^*$, $S_2^*$, $S_3^*$, and $S_4^*$ indicate the conjugates of $S_1$, $S_2$, $S_3$ and $S_4$ respectively.

With the continuous development of the LTE system, in order to increase the data transmission rate and spectrum efficiency in the downlink in the LTE-Advanced system, the related standards specify that at most eight transmission antennae can be used. In the present LTE standards, however, the diversity method for the eight transmission antennae is not defined, thus the data transmission based on eight transmission antennae cannot be implemented in the LTE-Advanced system so far, which brings inconvenience to the practical applications.

SUMMARY OF THE INVENTION

Therefore, the main purpose of the present invention is to offer a space diversity method and device to implement the data transmission based on eight antennae in the LTE-Advanced system and to acquire better diversity gain without adding extra pilot overhead.

In order to achieve the above purpose, the technical scheme of the present invention is implemented with the following method.

The present invention offers a space diversity method, and the method comprises:

setting the Alamouti-coder-based space-frequency block coder (SFBC) as the minimum unit of the space time coder;

orthogonally processing the SFBC to acquire the transmission signals of part of antenna ports in the eight antenna ports, cyclically delaying the acquired transmission signals of antenna ports to acquire the transmission signals of the rest antenna ports; and each antenna port transmitting the acquired transmission signal in the corresponding time and subcarrier.

Said orthogonally processing the SFBC in the above scheme is: multiplying one Alamouti coder pair in the SFBC by a rotation factor so that the Alamouti coder pair is orthogonal with another Alamouti coder pair when transmitting at the same time. Said rotation factor is $e^{j\theta}$, $\theta \in [0,2\pi]$.

In the above scheme, said acquiring the transmission signals of part of the antenna ports is: acquiring the transmission signal of four in the eight antenna ports; said cyclically delaying the acquired transmission signals of the antenna ports being phase rotation processing in frequency domain. Specifically, multiplying the acquired transmission signals of the four antenna ports by $e^{j2\pi k\tau/N}$ respectively to acquire the transmission signals of the other four antenna ports, wherein, N is the number of points in the inverse Fourier transform, k is the $k^{th}$ subcarrier, and $\tau$ is the cyclic delay in each antenna port.

In the above scheme, the corresponding relationship between said eight antenna ports and the formed space time coder matrix is:

$$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \end{array}$$
$$\begin{array}{c} \text{Subcarrier}_k \\ \text{Subcarrier}_{k+1} \\ \text{Subcarrier}_{k+2} \\ \text{Subcarrier}_{k+3} \end{array} \begin{bmatrix} S_1 & S_1 e^{j2\pi k\tau_1/N} & cS_3 & cS_3 e^{j2\pi k\tau_1/N} & -S_2^* & -S_2^* e^{j2\pi k\tau_1/N} & -S_4^* & -S_4^* e^{j2\pi k\tau_1/N} \\ S_2 & S_2 e^{j2\pi(k+1)\tau_1/N} & S_4 & S_4 e^{j2\pi(k+1)\tau_1/N} & S_1^* & S_1^* e^{j2\pi(k+1)\tau_1/N} & c^*S_3^* & c^*S_3^* e^{j2\pi(k+1)\tau_1/N} \\ S_3 & S_3 e^{j2\pi(k+2)\tau_1/N} & cS_1 & cS_1 e^{j2\pi(k+2)\tau_1/N} & -S_4^* & -S_4^* e^{j2\pi(k+2)\tau_1/N} & -S_2^* & -S_2^* e^{j2\pi(k+2)\tau_1/N} \\ S_4 & S_4 e^{j2\pi(k+3)\tau_1/N} & S_2 & S_2 e^{j2\pi(k+3)\tau_1/N} & S_3^* & S_3^* e^{j2\pi(k+3)\tau_1/N} & c^*S_1^* & c^*S_1^* e^{j2\pi(k+3)\tau_1/N} \end{bmatrix}$$

Or:

$$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \end{array}$$

$$\begin{array}{c} \text{Subcarrier } k \\ \text{Subcarrier } k+1 \\ \text{Subcarrier } k+2 \\ \text{Subcarrier } k+3 \end{array} \begin{bmatrix} S_1 & S_1 e^{j2\pi k\tau_1/N} & S_3 & S_3 e^{j2\pi k\tau_1/N} & -S_2^* & -S_2^* e^{j2\pi k\tau_1/N} & -cS_4^* & -cS_4^* e^{j2\pi k\tau_1/N} \\ S_2 & S_2 e^{j2\pi(k+1)\tau_1/N} & cS_4 & cS_4 e^{j2\pi(k+1)\tau_1/N} & S_1^* & S_1^* e^{j2\pi(k+1)\tau_1/N} & S_3^* & S_3^* e^{j2\pi(k+1)\tau_1/N} \\ S_3 & S_3 e^{j2\pi(k+2)\tau_1/N} & S_1 & S_1 e^{j2\pi(k+2)\tau_1/N} & -S_4^* & -S_4^* e^{j2\pi(k+2)\tau_1/N} & -cS_2^* & -cS_2^* e^{j2\pi(k+2)\tau_1/N} \\ S_4 & S_4 e^{j2\pi(k+3)\tau_1/N} & cS_2 & cS_2 e^{j2\pi(k+3)\tau_1/N} & S_3^* & S_3^* e^{j2\pi(k+3)\tau_1/N} & S_1^* & S_1^* e^{j2\pi(k+3)\tau_1/N} \end{bmatrix}$$

In the above scheme, when said rotation factor is 1, said acquiring the transmission signals of part of the antenna ports is: acquiring the transmission signals of two in the eight antenna ports; said cyclically delaying the acquired transmission signals of the two antenna ports is phase rotation processing in frequency domain. Specifically, multiplying the acquired transmission signals of the two antenna ports by $e^{j2\pi k\tau_1/N}$, $e^{j2\pi k\tau_2/N}$ and $e^{j2\pi k\tau_3/N}$ respectively to acquire the transmission signals of the rest six antenna ports, wherein, N is the number of points in the inverse Fourier transform, k is the $k^{th}$ subcarrier, and $\tau_1$, $\tau_2$ and $\tau_3$ are the cyclic delays in different antenna port.

Accordingly, the corresponding relationship between the eight antenna ports and the formed space time coder matrix is:

By multiplying the rotation factor of the SFBC, the present invention maintains the orthogonality of the transmitted symbols, increases the times of transmitting the symbols, as well as improves the diversity gain.

Figure 1:
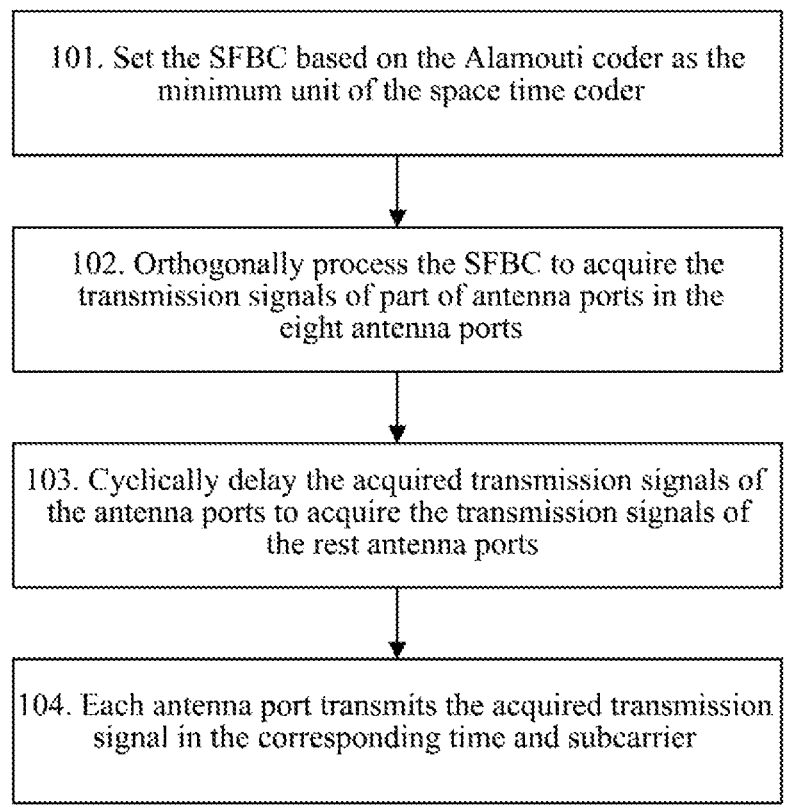
FIG. 1 is a flow chart of achieving the space diversity method in accordance with the present invention.

$$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \end{array}$$

$$\begin{array}{c} \text{Subcarrier } k \\ \text{Subcarrier } k+1 \\ \text{Subcarrier } k+2 \\ \text{Subcarrier } k+3 \end{array} \begin{bmatrix} S_1 & S_1 e^{j2\pi k\tau_1/N} & S_1 e^{j2\pi k\tau_2/N} & S_1 e^{j2\pi k\tau_3/N} & -S_2^* & -S_2^* e^{j2\pi k\tau_1/N} & -S_2^* e^{j2\pi k\tau_2/N} & -S_2^* e^{j2\pi k\tau_3/N} \\ S_2 & S_2 e^{j2\pi(k+1)\tau_1/N} & S_2 e^{j2\pi(k+1)\tau_2/N} & S_2 e^{j2\pi(k+1)\tau_3/N} & S_1^* & S_1^* e^{j2\pi(k+1)\tau_1/N} & S_1^* e^{j2\pi(k+1)\tau_2/N} & S_1^* e^{j2\pi(k+1)\tau_3/N} \\ S_3 & S_3 e^{j2\pi(k+2)\tau_1/N} & S_3 e^{j2\pi(k+2)\tau_2/N} & S_3 e^{j2\pi(k+2)\tau_3/N} & -S_4^* & -S_4^* e^{j2\pi(k+2)\tau_1/N} & -S_4^* e^{j2\pi(k+2)\tau_2/N} & -S_4^* e^{j2\pi(k+2)\tau_3/N} \\ S_4 & S_4 e^{j2\pi(k+3)\tau_1/N} & S_4 e^{j2\pi(k+3)\tau_2/N} & S_4 e^{j2\pi(k+3)\tau_3/N} & S_3^* & S_3^* e^{j2\pi(k+3)\tau_1/N} & S_3^* e^{j2\pi(k+3)\tau_2/N} & S_3^* e^{j2\pi(k+3)\tau_3/N} \end{bmatrix}$$

The present invention also offers a space diversity device, and the device comprises an orthogonal processing module, a signal cyclic delay module and a transmitting module.

The orthogonal processing module is used to orthogonally process the SFBC to acquire the transmission signals of part of antenna ports in the eight antenna ports;

the signal cyclic delay module is used to cyclically delay the acquired transmission signals of the antenna ports to acquire the transmission signals of the rest antenna ports; and the transmitting module is used to make each antenna port transmit the acquired transmission signal in the corresponding time and subcarrier.

The space diversity method and device offered in the present invention takes the SFBC based on the Alamouti coder as the minimum unit of the space time coder, and orthogonally processes the SFBC to acquire the transmission signals of part of antenna ports in the eight antenna ports, and uses the diversity method for combining the Alamouti coder with the cyclic delay diversity (CDD) to acquire the transmission signals of the rest antenna ports. Therefore, not only the data transmission based on eight transmission antennae in the LTE-Advanced system is implemented, but also the frequency diversity and the encoding gain of the SFBC are implemented, moreover, the time diversity gain is obtained with the CDD, thus the diversity gain degradation due to the correlation of the transmission antenna array can be reduced.

PREFERRED EMBODIMENTS OF THE PRESENT INVENTION

The basic idea of the present invention is: setting the SFBC based on Alamouti coder as the minimum unit of the space time coder, orthogonally processing the SFBC to acquire the transmission signals of part of antenna ports in the eight antenna ports, and cyclically delaying the acquired transmission signals of the antenna ports to acquire the transmission signals of the rest antenna ports, each antenna port transmitting the acquired transmission signal in the corresponding time and subcarrier.

Therefore, eight antennae diversity in the downlink in the LTE-Advanced system combines the SFBC and CDD, and different symbols correspond to different antennae, thus avoid the diversity gain degradation due to the antenna correlation, implement multi-dimensional diversity gain and maintain the orthogonality of the transmission signals.

In the present invention, the eight antenna ports form an eight-antenna array, and each antenna port represents an antenna. During the orthogonally processing and cyclically delaying processing, four or two in the eight antenna ports are taken as a group to be processed.

The process of implementing the CDD based space diversity method in accordance with the present invention is shown in FIG. 1, and the method comprises the following steps.

Step 101: set the SFBC based on the Alamouti coder as the minimum unit of the space time coder.

Since when the rank of the wireless channel is 1, the Alamouti space time coder method can reach to the channel capacity and acquire the maximum diversity gain, moreover, since the Alamouti codec is simple and can achieve the full diversity gain, the present invention takes the SFBC based on the Alamouti coder as the minimum unit of the space time coder.

Step 102: orthogonally process the SFBC to acquire the transmission signals of part of antenna ports in the eight antenna ports.

Herein, said orthogonal processing is multiplying one Alamouti coder pair in the SFBC by a rotation factor $c=e^{j\theta}$, $\theta \in [0,2\pi]$ to make it orthogonal with another Alamouti coder pair when transmitting at the same time. Especially, the rotation factor equals 1.

When four in the eight antenna ports are taken as a group, said acquiring part of the antenna ports is acquiring the transmission signals of the four antenna ports; when two in the eight antenna ports are taken as a group, said acquiring part of the antenna ports is acquiring the transmission signals of two antenna ports.

Step 103: cyclically delay the acquired transmission signals of the antenna ports to acquire the transmission signals of the rest antenna ports.

Herein, said cyclically delaying the acquired transmission signals of the antenna ports is equivalent to the phase rotation processing in frequency domain.

When four in the eight antenna ports are taken as a group, said acquiring the rest antenna ports is acquiring the transmission signals of the rest four antenna ports; when two in the eight antenna ports are taken as a group, said acquiring the rest antenna ports is acquiring the transmission signals of the rest six antenna ports.

Step 104: each antenna port transmits the acquired transmission signals in the corresponding time and subcarrier.

The First Embodiment

In this embodiment, four in the eight antenna ports are taken as a group. The space diversity method of the present embodiment comprises the following steps.

Step 11: set the SFBC based on the Alamouti coder as the minimum unit of the space time coder;

Step 12: orthogonally process the SFBC to acquire the transmission signals of the four antenna ports.

For the SFBC based on the Alamouti coder, the Alamouti encoder when using four antennae to transmit at the same time is shown in Equation (3):

$$\begin{bmatrix} S_1 & cS_3 & -S_2^* & -S_4^* \\ S_2 & S_4 & S_1^* & c^*S_3^* \\ S_3 & cS_1 & -S_4^* & -S_2^* \\ S_4 & S_2 & S_3^* & c^*S_1^* \end{bmatrix} \quad (3)$$

Herein, by processing the SFBC with the rotation factor, the two Alamouti coder pairs $$\begin{bmatrix} S_1 & -S_2^* \\ S_2 & S_1^* \end{bmatrix} \text{ and } \begin{bmatrix} S_3 & -S_4^* \\ S_4 & S_3^* \end{bmatrix}$$

are orthogonal with each other when transmitting at the same time. Specifically, multiply the second Alamouti coder pair $$\begin{bmatrix} S_3 & -S_4^* \\ S_4 & S_3^* \end{bmatrix}$$

with a rotation factor $c=e^{j\theta}$, $\theta \in [0,2\pi]$ to be $$\begin{bmatrix} cS_3 & -S_4^* \\ S_4 & c^*S_3^* \end{bmatrix},$$

therefore, it is orthogonal with the first Alamouti coder pair $$\begin{bmatrix} S_1 & -S_2^* \\ S_2 & S_1^* \end{bmatrix}$$

when transmitting at the same time, and good diversity gain can be maintained. Of course, the first Alamouti coder pair $$\begin{bmatrix} S_1 & -S_2^* \\ S_2 & S_1^* \end{bmatrix}$$

can be multiplied by a rotation factor c to become $$\begin{bmatrix} cS_1 & -S_2^* \\ S_2 & c^*S_1^* \end{bmatrix}$$

so that it is orthogonal with the second Alamouti coder $$\begin{bmatrix} S_3 & -S_4^* \\ S_4 & S_3^* \end{bmatrix}$$

when transmitting at the same time.

Each column in Equation (3) is the transmission signal of one antenna port.

Step 13: cyclically delay the acquired transmission signals of the four antenna ports to acquire the transmission signals of the antenna ports adjacent to said four antenna ports respectively.

Herein, since the LTE-Advanced system uses eight antennae to transmit, when there is an eight-antenna array, the interval between the antennae is usually half of a wavelength at the antenna transmission frequency, in this case, the correlation of the transmission antenna array is very strong, in comparison with the LTE diversity technology (see 3GPP R-071333), however, it has proved that the antenna correlation has no evident effect on the CDD diversity gain. Therefore, the present invention cyclically delays the Alamouti coder on the basis of four antennae, and uses the diversity method for combining the CDD with the Alamouti coder. This diversity method comprises: using the signals of four antennae as the transmission signals of four in the eight antenna ports; cyclically delaying the available transmission signals of the four antenna ports by $\tau_1$, $\tau_1 \neq 0$ to acquire the transmission signals of the other four antennae; taking the acquired other four antenna ports as the adjacent antennae of the available four antenna ports respectively.

Two specific examples of the corresponding relationship between the space time coder matrix and the transmission antenna ports based on the above method are illustrated in the following, and the first corresponding relationship is shown in Equation (4), and the second corresponding relationship is shown in Equation (5).

In practical applications, the cyclic delay of antenna port 1, antenna port 3, antenna port 5 and antenna 7 can be the same, for example, the delay is $\tau_1$; alternatively, the delays for antenna port 1, antenna port 3, antenna port 5 and antenna port $$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \\ \begin{array}{c}\text{Subcarrier}_k \\ \text{Subcarrier}_{k+1} \\ \text{Subcarrier}_{k+2} \\ \text{Subcarrier}_{k+3}\end{array} \left[\begin{array}{cccccccc} S_1 & S_1 e^{j2\pi k\tau_1/N} & cS_3 & cS_3 e^{j2\pi k\tau_1/N} & -S_2^* & -S_2^* e^{j2\pi k\tau_1/N} & -S_4^* & -S_4^* e^{j2\pi k\tau_1/N} \\ S_2 & S_2 e^{j2\pi(k+1)\tau_1/N} & S_4 & S_4 e^{j2\pi(k+1)\tau_1/N} & S_1^* & S_1^* e^{j2\pi(k+1)\tau_1/N} & c^*S_3^* & c^*S_3^* e^{j2\pi(k+1)\tau_1/N} \\ S_3 & S_3 e^{j2\pi(k+2)\tau_1/N} & cS_1 & cS_1 e^{j2\pi(k+2)\tau_1/N} & -S_4^* & -S_4^* e^{j2\pi(k+2)\tau_1/N} & -S_2^* & -S_2^* e^{j2\pi(k+2)\tau_1/N} \\ S_4 & S_4 e^{j2\pi(k+3)\tau_1/N} & S_2 & S_2 e^{j2\pi(k+3)\tau_1/N} & S_3^* & S_3^* e^{j2\pi(k+3)\tau_1/N} & c^*S_1^* & c^*S_1^* e^{j2\pi(k+3)\tau_1/N} \end{array}\right] \end{array} \quad (4)$$

In Equation (4), each column represents one antenna port and each row represents a subcarrier sent by the space time coder symbol or an orthogonal frequency division multiplexing (OFDM) symbol. N in $e^{j2\pi k\tau/N}$ in Equation (4) is the number of points in the inverse Fourier transform, and k represents the $k^{th}$ subcarrier, k=1 . . . N. Time delaying $\tau$, $\tau \in [0, 2N\pi)$ in each antenna port in time domain is equivalent to $k\tau/N$ in each subcarrier in frequency domain; that is, multiplying the acquired transmission signals of the four antenna ports by $e^{j2\pi k\tau/N}$ respectively. Specifically, antenna port 1, antenna port 3, antenna port 5 and antenna port 7 form Alamouti coders which are orthogonal and sent evenly and distributively, and cyclically delay the Alamouti coders of antenna port 1, antenna port 3, antenna port 5 and antenna port 7 by $\tau_1$, $\tau_1 \neq 0$ to form the signals transmitted at antenna port 2, antenna port 4, antenna port 6 and antenna port 8, since the signals transmitted at antenna port 2, antenna port 4, antenna port 6 and antenna port 8 are delayed by $\tau_1$ at the same time, the orthogonality of the Alamouti coders can still be maintained.

Another corresponding relationship between the space time coder matrix and the transmission antenna ports can be formed if the rotation factor is multiplied by different symbols in the Alamouti coder pair:

7 can also be different, as long as perform the same cyclic delay for the antenna ports in the same group. For example, cyclically delay antenna port 1 and antenna port 3 by $\tau_1$, and cyclically delay antenna port 5 and antenna port 7 by $\tau_2$, $\tau_1 \neq \tau_2$.

Step 14: each antenna port transmits the acquired transmission signal in the corresponding time and subcarrier.

Herein, said acquired transmission signals refer to the orthogonally processed signals, such as the signals of antenna port 1, antenna port 3, antenna port 5 and antenna port 7; or the orthogonally processed and cyclically delayed signals, such as the signals of antenna port 2, antenna port 4, antenna port 6 and antenna port 8. Each antenna port can transmit the corresponding signal in the corresponding time and subcarrier according to the corresponding relationship given in equation (4) or (5).

For example, antenna port 1 transmits signal $S_1$ in the subcarrier k in the first time; antenna port 1 transmits signal $S_2$ in the subcarrier k+1 in the second time; antenna port 1 transmits signal $S_3$ in the subcarrier k+2 in the third time; antenna port 1 transmits signal $S_4$ in the subcarrier k+3 in the fourth time; antenna port 2 transmits signal $S_1 e^{j2\pi k\tau_1/N}$ in the subcarrier k at the time of the first time+delay $\tau_1$; antenna port 2 transmits signal $S_2 e^{j2\pi(k+1)\tau_1/N}$ in the subcarrier k+1 at the $$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \\ \begin{array}{c}\text{Subcarrier}_k \\ \text{Subcarrier}_{k+1} \\ \text{Subcarrier}_{k+2} \\ \text{Subcarrier}_{k+3}\end{array} \left[\begin{array}{cccccccc} S_1 & S_1 e^{j2\pi k\tau_1/N} & S_3 & S_3 e^{j2\pi k\tau_1/N} & -S_2^* & -S_2^* e^{j2\pi k\tau_1/N} & -c S_4^* & -c S_4^* e^{j2\pi k\tau_1/N} \\ S_2 & S_2 e^{j2\pi(k+1)\tau_1/N} & cS_4 & cS_4 e^{j2\pi(k+1)\tau_1/N} & S_1^* & S_1^* e^{j2\pi(k+1)\tau_1/N} & S_3^* & S_3^* e^{j2\pi(k+1)\tau_1/N} \\ S_3 & S_3 e^{j2\pi(k+2)\tau_1/N} & S_1 & S_1 e^{j2\pi(k+2)\tau_1/N} & -S_4^* & -S_4^* e^{j2\pi(k+2)\tau_1/N} & -c^*S_2^* & -c^*S_2^* e^{j2\pi(k+2)\tau_1/N} \\ S_4 & S_4 e^{j2\pi(k+3)\tau_1/N} & cS_2 & cS_2 e^{j2\pi(k+3)\tau_1/N} & S_3^* & S_3^* e^{j2\pi(k+3)\tau_1/N} & S_1^* & S_1^* e^{j2\pi(k+3)\tau_1/N} \end{array}\right] \end{array} \quad (5)$$

In Equation (5), each column represents an antenna port and each row represents a subcarrier sent by the space time coder symbol or an OFDM symbol. N in $e^{j2\pi k\tau/N}$ in Equation (5) is the number of points in the inverse Fourier transform, and k represents the $k^{th}$ subcarrier, and k=1 . . . N. Time delaying $\tau$, $\tau \in [0, 2N\pi)$ in each antenna port in time domain is equivalent to phase rotation $k\tau/N$ in each subcarrier in frequency domain; that is, multiplying the acquired transmission signals of the four antenna ports by $e^{j2\pi k\tau/N}$. Specifically, antenna port 1, antenna port 3, antenna port 5 and antenna port 7 form the Alamouti coders which are orthogonal and sent evenly and distributively, and cyclically delay the Alamouti coders of antenna port 1, antenna port 3, antenna port 5 and antenna port 7 by $\tau_1$, $\tau_1 \neq 0$ to form the signals transmitted at antenna port 2, antenna port 4, antenna port 6 and antenna port 8, since the signals transmitted at antenna port 2, antenna port 4, antenna port 6 and antenna port 8 are delayed by $\tau_1$, the orthogonality of the Alamouti coder can still be maintained.

time of the second time+delay $\tau_1$; antenna port 2 transmits signal $S_3 e^{j2\pi(k+2)\tau_1/N}$ in the subcarrier k+2 at the time of the third time+delay $\tau_1$; antenna port 2 transmits signal $S_2 e^{j2\pi\tau_1/N}$ in the subcarrier k+3 at the time of the fourth time+$\tau_1$, and so forth.

The Second Embodiment

In this embodiment, two in the eight antenna ports are taken as a group, and the rotation factor is 1. The space diversity method of this embodiment comprises the following steps:

Step 21: set the SFBC based on the Alamouti coder as the minimum unit of the space time coder;

Step 22: orthogonally process the SFBC to acquire the transmission signals of two antenna ports.

Herein, said orthogonally processing means processing the SFBC with the rotation factor, and the rotation factor equals 1.

Step 23: cyclically delay the acquired transmission signals of the two antenna ports to acquire the transmission signals of the other six antenna ports.

Wherein, said cyclically delaying is equivalent to phase rotation processing in frequency domain, specifically, multiply the acquired transmissions signals of the two antenna ports by $e^{j2\pi k\tau_1/N}$, $e^{j2\pi k\tau_2/N}$ and $e^{j2\pi k\tau_3/N}$ respectively to acquire the transmission signals of the other six antenna ports.

Herein, said acquired corresponding relationship between the space time coder matrix and the transmission antenna ports is shown in equation (6):

between each transmission antenna port and the space time coder matrix is shown in equation (4), equation (5) or equation (6).

The transmission module 23 is used to make each antenna port transmit the acquired transmission signal in the corresponding time and subcarrier. Herein, each antenna port can transmit the corresponding signal in the corresponding time and subcarrier according to the corresponding relationship given in equation (4), equation (5) or equation (6).

The above embodiments are only the preferred embodiments of the present invention, not intended to limit the pro- $$\begin{array}{c} \text{Antenna port 1} \quad \text{Antenna port 2} \quad \text{Antenna port 3} \quad \text{Antenna port 4} \quad \text{Antenna port 5} \quad \text{Antenna port 6} \quad \text{Antenna port 7} \quad \text{Antenna port 8} \end{array} \quad (6)$$

$$\begin{array}{c} \text{Subcarrier}_{k} \\ \text{Subcarrier}_{k+1} \\ \text{Subcarrier}_{k+2} \\ \text{Subcarrier}_{k+3} \end{array} \begin{bmatrix} S_1 & S_1 e^{j2\pi k\tau_1/N} & S_1 e^{j2\pi k\tau_2/N} & S_1 e^{j2\pi k\tau_3/N} & -S_2^* & -S_2^* e^{j2\pi k\tau_1/N} & -S_2^* e^{j2\pi k\tau_2/N} & -S_2^* e^{j2\pi k\tau_3/N} \\ S_2 & S_2 e^{j2\pi(k+1)\tau_1/N} & S_2 e^{j2\pi(k+1)\tau_2/N} & S_2 e^{j2\pi(k+1)\tau_3/N} & S_1^* & S_1^* e^{j2\pi(k+1)\tau_1/N} & S_1^* e^{j2\pi(k+1)\tau_2/N} & S_1^* e^{j2\pi(k+1)\tau_3/N} \\ S_3 & S_3 e^{j2\pi(k+2)\tau_1/N} & S_3 e^{j2\pi(k+2)\tau_2/N} & S_3 e^{j2\pi(k+2)\tau_3/N} & -S_4^* & -S_4^* e^{j2\pi(k+2)\tau_1/N} & -S_4^* e^{j2\pi(k+2)\tau_2/N} & -S_4^* e^{j2\pi(k+2)\tau_3/N} \\ S_4 & S_4 e^{j2\pi(k+3)\tau_1/N} & S_4 e^{j2\pi(k+3)\tau_2/N} & S_4 e^{j2\pi(k+3)\tau_3/N} & S_3^* & S_3^* e^{j2\pi(k+3)\tau_1/N} & S_3^* e^{j2\pi(k+3)\tau_2/N} & S_3^* e^{j2\pi(k+3)\tau_3/N} \end{bmatrix}$$

In equation (6), each column represents one antenna port and each column represents a subcarrier sent by the space time coder symbol or an OFDM symbol. N in Equation (6) is the number of points in the inverse Fourier transform, and k represents the $k^{th}$ subcarrier, k=1 ... N. Time delaying $\tau_1$, $\tau_2$ or $\tau_3$, $\tau_1$, $\tau_2$, $\tau_3 \in [0, 2N\pi)$ in each antenna port in time domain is equivalent to phase rotation $k\tau/N$ in each subcarrier in frequency domain, that is, multiplying the acquired transmission signals of the two antenna ports by $e^{j2\pi k\tau_1/N}$, $e^{j2\pi k\tau_2/N}$ and $e^{j2\pi k\tau_3/N}$ respectively.

The present embodiment forms two Alamouti coders $$\begin{bmatrix} S_1 & -S_2^* \\ S_2 & S_1^* \end{bmatrix} \text{ and } \begin{bmatrix} S_3 & -S_4^* \\ S_4 & S_3^* \end{bmatrix}$$

at antenna port 1 and antenna port 5 respectively, antenna port 2 and antenna port 6 cyclically delay the two Alamouti coder pairs by $\tau_1$, that is, multiplying the two Alamouti coder pairs by $e^{j2\pi k\tau_1/N}$; antenna port 3 and antenna port 7 cyclically delay both Alamouti coder pair by $\tau_2$, that is, multiplying the two Alamouti coder pairs by $e^{j2\pi k\tau_2/N}$; antenna port 4 and antenna port 8 cyclically delay both Alamouti coder pair by $\tau_3$, that is, multiplying the two Alamouti coder pairs by $e^{j2\pi k\tau_3/N}$.

Figure 2:
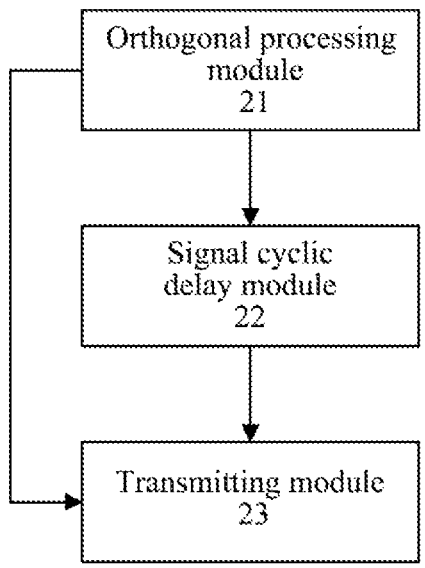
FIG. 2 is a structure schematic diagram of composition of the space diversity device in accordance with the present invention.

In order to implement the above method, as shown in FIG. 2, the present invention also offers a space diversity device, and the device comprises an orthogonal processing module 21, a signal cyclic delay module 22 and a transmitting module 23.

The orthogonal processing module 21 is used to orthogonally process the SFBC to acquire the transmission signals of part of antenna ports in the eight antenna ports. Herein, said orthogonal processing is multiplying one Alamouti coder pair in the SFBC with a rotation factor $c=e^{j\theta}$, $\theta \in [0, 2\pi]$ so as to make it orthogonal with the other Alamouti coder when transmitting at the same time; especially, the rotation factor c is 1.

The signal cyclic delay module 22 is used to cyclically delay the acquired transmission signals of the antenna ports to acquire the transmission signals of the rest antenna ports. Herein, the acquired transmission signals of the antenna ports are the acquired transmission signals processed by the orthogonal processing module 21, and what are acquired can be the transmission signals of four or two antenna ports.

With the above orthogonal processing or the orthogonal processing plus cyclically delaying processing, the transmission signals of the eight antenna ports respectively in different carriers can be acquired, and the corresponding relationships tection scope of the present invention, and the present invention can be modified, replaced equivalently or improved without departing from the spirit and principle of the present invention, and all these kinds of modification, equivalent replacement or improvement should belong to the protection scope of the present invention.

INDUSTRIAL APPLICABILITY

The space diversity method and device offered in the present invention not only implement the data transmission based on eight transmission antennae in the LTE-Advanced system, but also implement the frequency diversity and the coder gain of the SFBC, moreover, the time diversity gain is acquired by the CDD, thus the diversity gain degradation due to the transmission antenna array channel correlation can be reduced without adding extra pilot overhead. By multiplying the rotation factor of the SFBC, the present invention maintains the orthogonality of the transmitted symbols, increases the times of transmitting the symbols, and improves the diversity gain.

What is claimed is:
1. A space diversity method, comprising:
   setting an Alamouti-coder-based space frequency block coder as a minimum unit of a space time coder;
   orthogonally processing the space frequency block coder to acquire transmission signals of part of antenna ports in eight antenna ports, and cyclically delaying the acquired transmission signals of antenna ports to acquire the transmission signals of the rest antenna ports; and
   each antenna port transmitting the acquired transmission signal in a corresponding time and subcarrier;
   the step of orthogonally processing the space frequency block coder to acquire transmission signals of part of antenna ports in eight antenna ports, and cyclically delaying the acquired transmission signals of antenna ports to acquire the transmission signals of the rest antenna ports comprises:
   acquiring the transmission signals of four antenna ports in the eight antenna ports, and multiplying the acquired transmission signals of the four antenna ports by $e^{j2\pi k\tau/N}$ respectively to acquire the transmission signals of the rest four antenna ports, wherein, N is the number of points in inverse Fourier transform, k represents a $k^{th}$ subcarrier, and $\tau$ is a cyclic delay in each antenna port; or
   acquiring the transmission signals of two antenna ports in the eight antenna ports, and multiplying the acquired transmission signals of the two antenna ports by $e^{j2\pi k\tau_1/N}$, $e^{j2\pi k\tau_2/N}$ and $e^{j2\pi k\tau_3/N}$ respectively to acquire the transmission signals of the rest six antenna ports, wherein, N is the number of points in inverse Fourier transform, k represents a $k^{th}$ subcarrier, and $\tau_1$, $\tau_2$ and $\tau_3$ are cyclic delays in different antenna ports.

2. The space diversity method of claim 1, wherein, said orthogonally processing the space frequency block coder is: multiplying one Alamouti coder pair in the space frequency block coder by a rotation factor so that the Alamouti coder pair is orthogonal with another Alamouti coder pair when transmitting at the same time.

3. The space diversity method of claim 2, wherein, said rotation factor is $e^{j\Theta}$, $\Theta \in [0, 2\pi]$.

4. The space diversity method of claim 3, wherein, said rotation factor is 1.

5. The space diversity method of claim 4, wherein, a corresponding relationship between the eight antenna ports and a formed space time coder matrix is:

$$\begin{array}{c} \\ \text{Subcarrier } k \\ \text{Subcarrier } k+1 \\ \text{Subcarrier } k+2 \\ \text{Subcarrier } k+3 \end{array} \begin{bmatrix} \text{Ant 1} & \text{Ant 2} & \text{Ant 3} & \text{Ant 4} & \text{Ant 5} & \text{Ant 6} & \text{Ant 7} & \text{Ant 8} \\ S_1 & S_1 e^{j2\pi k\tau_1/N} & S_1 e^{j2\pi k\tau_2/N} & S_1 e^{j2\pi k\tau_3/N} & -S_2^* & -S_2^* e^{j2\pi k\tau_1/N} & -S_2^* e^{j2\pi k\tau_2/N} & -S_2^* e^{j2\pi k\tau_3/N} \\ S_2 & S_2 e^{j2\pi(k+1)\tau_1/N} & S_2 e^{j2\pi(k+1)\tau_2/N} & S_2 e^{j2\pi(k+1)\tau_3/N} & S_1^* & S_1^* e^{j2\pi(k+1)\tau_1/N} & S_1^* e^{j2\pi(k+1)\tau_2/N} & S_1^* e^{j2\pi(k+1)\tau_3/N} \\ S_3 & S_3 e^{j2\pi(k+2)\tau_1/N} & S_3 e^{j2\pi(k+2)\tau_2/N} & S_3 e^{j2\pi(k+2)\tau_3/N} & -S_4^* & -S_4^* e^{j2\pi(k+2)\tau_1/N} & -S_4^* e^{j2\pi(k+2)\tau_2/N} & -S_4^* e^{j2\pi(k+2)\tau_3/N} \\ S_4 & S_4 e^{j2\pi(k+3)\tau_1/N} & S_4 e^{j2\pi(k+3)\tau_2/N} & S_4 e^{j2\pi(k+3)\tau_3/N} & S_3^* & S_3^* e^{j2\pi(k+3)\tau_1/N} & S_3^* e^{j2\pi(k+3)\tau_2/N} & S_3^* e^{j2\pi(k+3)\tau_3/N} \end{bmatrix}$$

wherein, k represents the $k^{th}$ subcarrier, $\tau_1$, $\tau_2$ and $\tau_3$ are the cyclic delays, $k\tau/N$ is the phase rotation, and N is the number of points in the inverse Fourier transform.

6. The space diversity method of claim 3, wherein, a corresponding relationship between said eight antenna ports and a formed space time coder matrix is:

$$\begin{array}{c} \\ \text{Subcarrier } k \\ \text{Subcarrier } k+1 \\ \text{Subcarrier } k+2 \\ \text{Subcarrier } k+3 \end{array} \begin{bmatrix} \text{Ant 1} & \text{Ant 2} & \text{Ant 3} & \text{Ant 4} & \text{Ant 5} & \text{Ant 6} & \text{Ant 7} & \text{Ant 8} \\ S_1 & S_1 e^{j2\pi k\tau_1/N} & cS_3 & cS_3 e^{j2\pi k\tau_1/N} & -S_2^* & -S_2^* e^{j2\pi k\tau_1/N} & -S_4^* & -S_4^* e^{j2\pi k\tau_1/N} \\ S_2 & S_2 e^{j2\pi(k+1)\tau_1/N} & S_4 & S_4 e^{j2\pi(k+1)\tau_1/N} & S_1^* & S_1^* e^{j2\pi(k+1)\tau_1/N} & c^*S_3^* & c^*S_3^* e^{j2\pi(k+1)\tau_1/N} \\ S_3 & S_3 e^{j2\pi(k+2)\tau_1/N} & cS_1 & cS_1 e^{j2\pi(k+2)\tau_1/N} & -S_4^* & -S_4^* e^{j2\pi(k+2)\tau_1/N} & -S_2^* & -S_2^* e^{j2\pi(k+2)\tau_1/N} \\ S_4 & S_4 e^{j2\pi(k+3)\tau_1/N} & S_2 & S_2 e^{j2\pi(k+3)\tau_1/N} & S_3^* & S_3^* e^{j2\pi(k+3)\tau_1/N} & c^*S_1^* & c^*S_1^* e^{j2\pi(k+3)\tau_1/N} \end{bmatrix}$$

Or:

$$\begin{array}{c} \\ \text{Subcarrier } k \\ \text{Subcarrier } k+1 \\ \text{Subcarrier } k+2 \\ \text{Subcarrier } k+3 \end{array} \begin{bmatrix} \text{Ant 1} & \text{Ant 2} & \text{Ant 3} & \text{Ant 4} & \text{Ant 5} & \text{Ant 6} & \text{Ant 7} & \text{Ant 8} \\ S_1 & S_1 e^{j2\pi k\tau_1/N} & S_3 & S_3 e^{j2\pi k\tau_1/N} & -S_2^* & -S_2^* e^{j2\pi k\tau_1/N} & -cS_4^* & -cS_4^* e^{j2\pi k\tau_1/N} \\ S_2 & S_2 e^{j2\pi(k+1)\tau_1/N} & cS_4 & cS_4 e^{j2\pi(k+1)\tau_1/N} & S_1^* & S_1^* e^{j2\pi(k+1)\tau_1/N} & S_3^* & S_3^* e^{j2\pi(k+1)\tau_1/N} \\ S_3 & S_3 e^{j2\pi(k+2)\tau_1/N} & S_1 & S_1 e^{j2\pi(k+2)\tau_1/N} & -S_4^* & -S_4^* e^{j2\pi(k+2)\tau_1/N} & -cS_2^* & -cS_2^* e^{j2\pi(k+2)\tau_1/N} \\ S_4 & S_4 e^{j2\pi(k+3)\tau_1/N} & cS_2 & cS_2 e^{j2\pi(k+3)\tau_1/N} & S_3^* & S_3^* e^{j2\pi(k+3)\tau_1/N} & S_1^* & S_1^* e^{j2\pi(k+3)\tau_1/N} \end{bmatrix}$$

wherein, k represents the $k^{th}$ subcarrier, $\tau_1$ is the cyclic delay, $k\tau/N$ is the phase rotation, and N in $e^{j2\pi k\tau/N}$ is the number of points in the inverse Fourier transform.

7. The space diversity method of claim 2, wherein, said rotation factor is 1.

8. The space diversity method of claim 7, wherein, a corresponding relationship between the eight antenna ports and a formed space time coder matrix is:

$$\begin{array}{c} \\ \text{Subcarrier } k \\ \text{Subcarrier } k+1 \\ \text{Subcarrier } k+2 \\ \text{Subcarrier } k+3 \end{array} \begin{bmatrix} \text{Ant 1} & \text{Ant 2} & \text{Ant 3} & \text{Ant 4} & \text{Ant 5} & \text{Ant 6} & \text{Ant 7} & \text{Ant 8} \\ S_1 & S_1 e^{j2\pi k\tau_1/N} & S_1 e^{j2\pi k\tau_2/N} & S_1 e^{j2\pi k\tau_3/N} & -S_2^* & -S_2^* e^{j2\pi k\tau_1/N} & -S_2^* e^{j2\pi k\tau_2/N} & -S_2^* e^{j2\pi k\tau_3/N} \\ S_2 & S_2 e^{j2\pi(k+1)\tau_1/N} & S_2 e^{j2\pi(k+1)\tau_2/N} & S_2 e^{j2\pi(k+1)\tau_3/N} & S_1^* & S_1^* e^{j2\pi(k+1)\tau_1/N} & S_1^* e^{j2\pi(k+1)\tau_2/N} & S_1^* e^{j2\pi(k+1)\tau_3/N} \\ S_3 & S_3 e^{j2\pi(k+2)\tau_1/N} & S_3 e^{j2\pi(k+2)\tau_2/N} & S_3 e^{j2\pi(k+2)\tau_3/N} & -S_4^* & -S_4^* e^{j2\pi(k+2)\tau_1/N} & -S_4^* e^{j2\pi(k+2)\tau_2/N} & -S_4^* e^{j2\pi(k+2)\tau_3/N} \\ S_4 & S_4 e^{j2\pi(k+3)\tau_1/N} & S_4 e^{j2\pi(k+3)\tau_2/N} & S_4 e^{j2\pi(k+3)\tau_3/N} & S_3^* & S_3^* e^{j2\pi(k+3)\tau_1/N} & S_3^* e^{j2\pi(k+3)\tau_2/N} & S_3^* e^{j2\pi(k+3)\tau_3/N} \end{bmatrix}$$

wherein, k represents the $k^{th}$ subcarrier, $\tau_1$, $\tau_2$, $\tau_3$ are the cyclic delays, $k\tau/N$ is the phase rotation, and N is the number of points in the inverse Fourier transform.

9. A space diversity device, comprising an orthogonal processing module, a signal cyclic delay module and a transmitting module, wherein, the orthogonal processing module is used to orthogonally process a space frequency block coder to acquire transmission signals of part of antenna ports in eight antenna ports;

the signal cyclic delay module is used to cyclically delay the acquired transmission signals of antenna ports to acquire the transmission signals of the rest antenna ports; and the transmitting module is used to make each antenna port transmit the acquired transmission signal in a corresponding time and subcarrier;

wherein the orthogonal processing module is used to orthogonally process a space frequency block coder to acquire transmission signals of four antenna ports in the eight antenna ports, and the signal cyclic delay module is used to multiply the acquired transmission signals of the four antenna ports by $e^{j2\pi k\tau/N}$ respectively to acquire the transmission signals of the rest four antenna ports, wherein, N is the number of points in inverse Fourier transform, k represents a $k^{th}$ subcarrier, and $\tau$ is a cyclic delay in each antenna port; or the orthogonal processing module is used to orthogonally process a space frequency block coder to acquire transmission signals of two antenna ports in the eight antenna ports, and the signal cyclic delay module is used to multiply the acquired transmission signals of the two antenna ports by $e^{j2\pi k\tau_1/N}$, $e^{j2\pi k\tau_2/N}$ and $e^{j2\pi k\tau_3/N}$ respectively to acquire the transmission signals of the rest six antenna ports, wherein, N is the number of points in inverse Fourier transform, k represents a $k^{th}$ subcarrier, and $\tau_1$, $\tau_2$ and $\tau_3$ are cyclic delays in different antenna ports.

10. The space diversity device of claim 9, wherein, said orthogonally processing the space frequency block coder is: multiplying one Alamouti coder pair in the space frequency block coder by a rotation factor so that the Alamouti coder pair is orthogonal with another Alamouti coder pair when transmitting at the same time.

11. The space diversity device of claim 10, wherein, said rotation factor is $e^{j\theta}$, $\theta \in [0, 2\pi]$.

12. The space diversity device of claim 10, wherein, said rotation factor is 1.

13. The space diversity device of claim 11, wherein, said rotation factor is 1.

\* \* \* \* \*